(12) United States Patent
Spertus (10) Patent No.: US 9,578,057 B1
(45) Date of Patent: Feb. 21, 2017

(54) TECHNIQUES FOR DETECTING AN INTRANET SPOOFING ATTACK

(71) Applicant: Symantec Corporation, Mountain View, CA (US)

(72) Inventor: Michael Spertus, Wilmette, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/135,096

(22) Filed: Dec. 19, 2013

(51) Int. Cl.
*H04L 29/06* (2006.01)
*H04W 12/12* (2009.01)

(52) U.S. Cl.
CPC .......... *H04L 63/1483* (2013.01); *H04W 12/12* (2013.01)

(58) Field of Classification Search
CPC .......................... H04L 63/1483; H04W 12/12
See application file for complete search history.

(56) References Cited

U.S. PATENT DOCUMENTS

| | | | |
|---|---|---|---|
| 2007/0039038 A1* | 2/2007 | Goodman et al. | 726/2 |
| 2007/0082697 A1* | 4/2007 | Bumiller et al. | 455/552.1 |
| 2008/0046738 A1* | 2/2008 | Galloway et al. | 713/176 |
| 2008/0216162 A1* | 9/2008 | Hatano | 726/7 |
| 2008/0271150 A1* | 10/2008 | Boerger | G06F 21/32 726/25 |
| 2009/0070582 A1* | 3/2009 | Aura | H04L 63/0823 713/168 |
| 2010/0211997 A1* | 8/2010 | McGeehan | G06F 21/316 726/4 |
| 2010/0275024 A1* | 10/2010 | Abdulhayoglu | 713/175 |
| 2013/0145462 A1* | 6/2013 | Hsu | H04L 12/585 726/22 |
| 2015/0281244 A1* | 10/2015 | Wen | H04L 63/1483 726/1 |

OTHER PUBLICATIONS

Geer, "Security Technologies Go Phishing", Jun. 2005, pp. 18-21.*

* cited by examiner

*Primary Examiner* — David Pearson
*Assistant Examiner* — Thaddeus Plecha
(74) *Attorney, Agent, or Firm* — Wilmer Cutler Pickering Hale and Dorr LLP (57) ABSTRACT

Techniques for detecting an intranet spoofing attack are disclosed. In one embodiment, the techniques may be realized as a system and method for detecting an intranet spoofing attack. For example, the system may comprise one or more processors communicatively coupled to a network. The one or more processors may be configured to: identify an attempt to access an intranet website at a user device; determine that the intranet website is a spoofed intranet website; and perform an action in response to the determination of the spoofed intranet website to protect user.

20 Claims, 4 Drawing Sheets

TECHNIQUES FOR DETECTING AN INTRANET SPOOFING ATTACK

FIELD OF THE DISCLOSURE

The present disclosure relates generally to network security and monitoring and, more particularly, to techniques for detecting an intranet spoofing attack.

BACKGROUND OF THE DISCLOSURE

Spoofing attacks are becoming increasingly prevalent in the digital age. There are many types spoofing attacks, such as TCP/IP spoofing, referrer spoofing, caller ID spoofing, and email address spoofing. In each instance, a malicious party or program successfully masquerades as another party or program in order to obtain sensitive or personal information from an unsuspecting user. An intranet website spoofing attack is no different. Enterprise users are accustomed to entering proprietary information or data on intranet websites. In an intranet spoofing attack, a malicious party may create a wireless access point nearby a corporate office, for example, and host spoofed an intranet website. If the wireless access point generates a sufficiently strong signal, an enterprise user using his or her corporate computing device may inadvertently access the spoofed intranet website believing the website is the real corporate intranet website. As a result, the enterprise user may thereby provide sensitive or personal information to the malicious party or program.

In view of the foregoing, it may be understood that there may be significant problems and shortcomings associated with conventional technologies for detecting an intranet spoofing attack.

SUMMARY OF THE DISCLOSURE

Techniques for detecting an intranet spoofing attack are disclosed. In one embodiment, the techniques may be realized as a system for detecting an intranet spoofing attack. For example, the system may comprise one or more processors communicatively coupled to a network. The one or more processors may be configured to identify an attempt to access an intranet website at a user device. The one or more processors may be configured to determine that the intranet website is a spoofed intranet website. The one or more processors may be configured to perform an action in response to the determination of the spoofed intranet website to protect user.

In accordance with other aspects of this embodiment, the user device may comprise an enterprise computing device. The user device may also comprise at least one of a desktop computer, a laptop computer, a tablet computer, a smart phone, and a web-enabled mobile device.

In accordance with further aspects of this embodiment, the attempt to access an intranet website by the user may be achieved using a browser agent that monitors user web activity.

In accordance with additional aspects of this embodiment, the spoofed intranet website may be hosted by a malicious party to target unsuspecting users to provide proprietary information. For example, the proprietary information may comprise at least one of personal information, corporate information, security information, financial data, a username, a password, a personal identification number (PIN), and a confidential communication.

In accordance with other aspects of this embodiment, determining the intranet website is a spoofed intranet website may comprise determining that the user device is operating outside of a known secure network. For example, determining that the user device is operating outside of a known secure network may be based on at least one of: determining a status of hard-wired connection to the known secure network, determining a status of a secure connection via hypertext transfer protocol secure (HTTPS), determining a status of a virtual private network (VPN) connection, comparing a uniform resource locator (URL) of the intranet website against a list of known uniform resource locator (URL) intranet websites, using a location-based service associated with the user device, using a sniffer to determine that network activity at the user device is external to the known secure network, and performing a secure public key handshake with a known intranet website.

In accordance with further aspects of this embodiment, the action may comprise at least one of: blocking access to the intranet website, logging access to the intranet website, notifying a user or an administrator associated with the user device that the intranet website is a spoofed intranet website, and redirecting access to another website.

In another embodiment, the techniques may be realized as a method for detecting an intranet website spoofing attack. For example, the method may comprise identifying an attempt to access an intranet website at a user device. The method may comprise determining that the intranet website is a spoofed intranet website. The method may also comprise performing an action in response to the determination of the spoofed intranet website to protect user.

In another embodiment, the techniques may be realized as an article of manufacture for detecting an intranet website spoofing attack. In one embodiment, the article of manufacture may comprise at least one processor readable storage medium, and instructions stored on the at least one medium. The instructions may be configured to be readable from the at least one medium by at least one processor and thereby cause the at least one processor to operate so as to identify an attempt to access an intranet website at a user device. The instructions may also be configured to be readable from the at least one medium by at least one processor and thereby cause the at least one processor to operate so as to determine that the intranet website is a spoofed intranet website. The instructions may be configured to be readable from the at least one medium by at least one processor and thereby cause the at least one processor to operate so as to perform an action in response to the determination of the spoofed intranet website to protect user.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 1 shows a block diagram depicting a network architecture for detecting an intranet spoofing attack in accordance with an embodiment of the present disclosure.

DETAILED DESCRIPTION OF EXEMPLARY EMBODIMENTS

Figure 1:
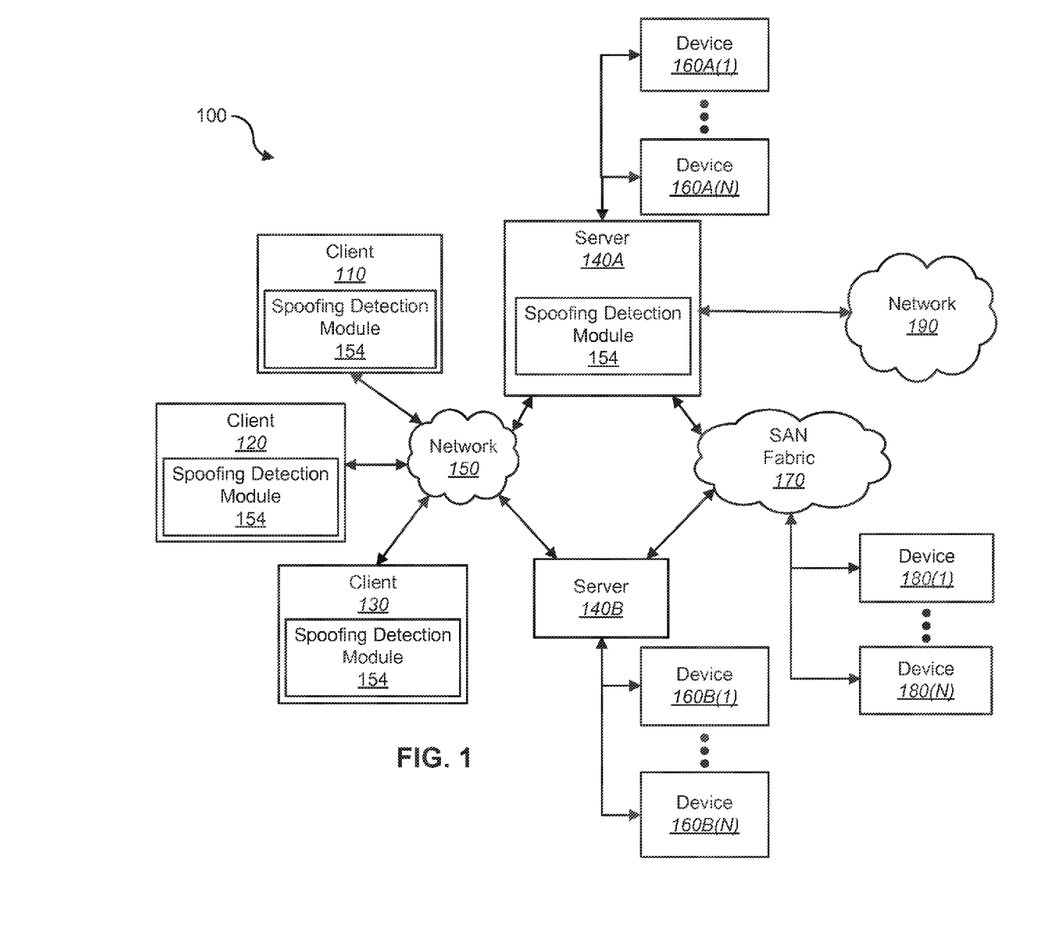

FIG. 1 shows a block diagram depicting a network architecture 100 for detecting an intranet spoofing attack in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., spoofing detection module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
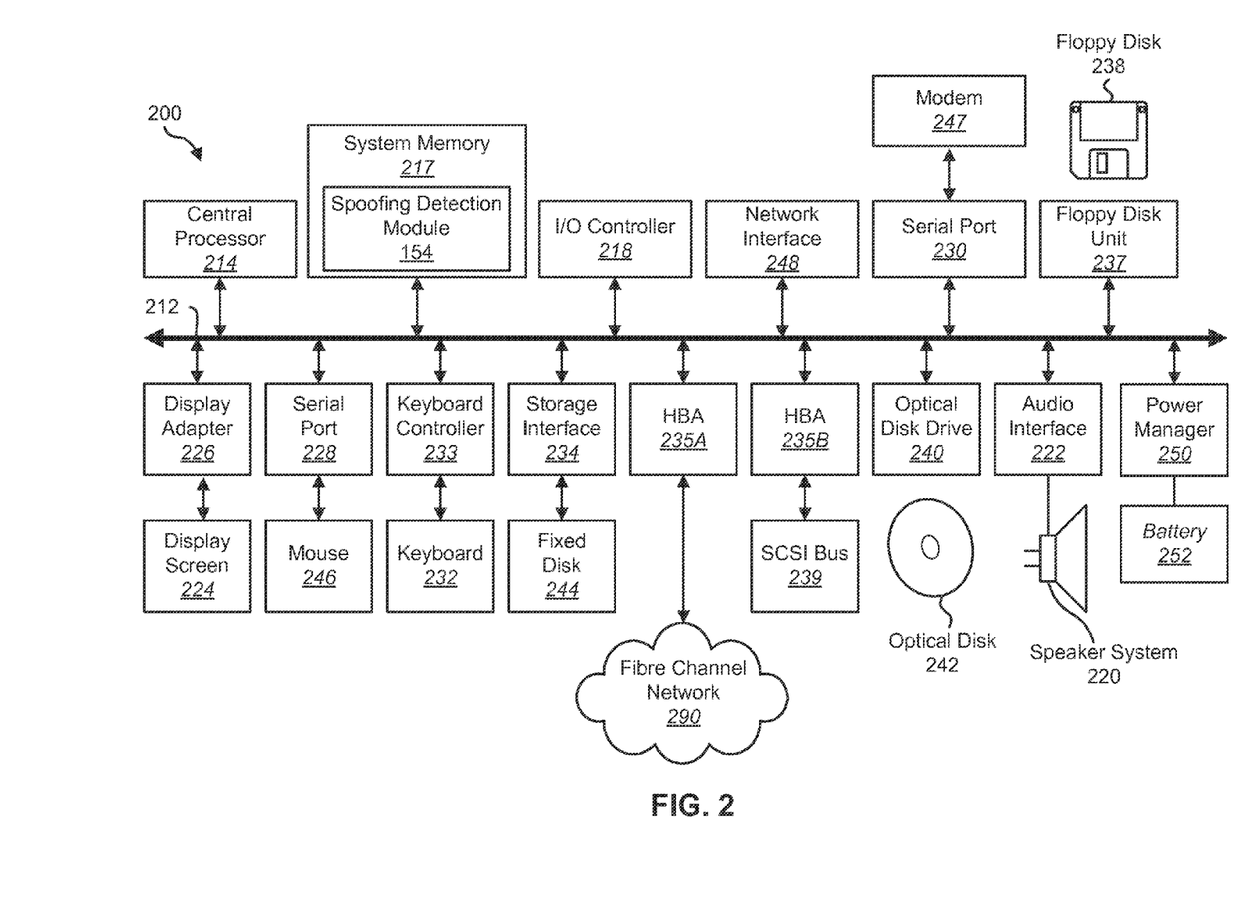
FIG. 2 depicts a block diagram of a computer system for detecting an intranet spoofing attack in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180 (1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for detecting an intranet spoofing attack such as, for example, spoofing detection module 154. As illustrated, one or more portions of spoofing detection module 154 may reside at a network centric location. For example, server 140A may be a server, a firewall, a gateway, or other network element that may perform one or more actions to provide role-based access control using dynamic shared accounts. According to some embodiments, network 190 may be an external network (e.g., the Internet) and server 140A may be a gateway or firewall between one or more internal components and clients and the external network.

Spoofing detection module 154 may provide, among other things, a way to detect a spoofing attack. As described above, spoofing attacks are becoming increasingly prevalent. In a spoofing attack, a malicious party or program successfully masquerades as another party or program in order to obtain sensitive or personal information from an unsuspecting user. In an intranet website spoofing attack, a malicious party may create a wireless access point nearby a corporate office, for example, and host spoofed an intranet website. If the wireless access point generates a sufficiently strong signal, an enterprise user using his or her corporate computing device may inadvertently access the spoofed intranet website believing the website is the real corporate intranet website. As a result, such an attack may cause the enterprise user to unknowingly provide sensitive or personal information to the malicious party or program via the spoofed intranet website.

Accordingly, spoofing detection module 154 may provide a way to detect a spoofing attack, or more specifically, an intranet website spoofing attack. By identifying an attempt to access an intranet website at a user device, determining that the intranet website is a spoofed intranet website using a host of techniques, and performing an action in response to the determination of the spoofed intranet website, the spoofing detection module 154 may protect a user, an enterprise or corporation, and transmission of secure and proprietary information to malicious entities, or a combination thereof.

FIG. 2 depicts a block diagram 200 of a computer system for detecting an intranet spoofing attack in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, spoofing detection module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
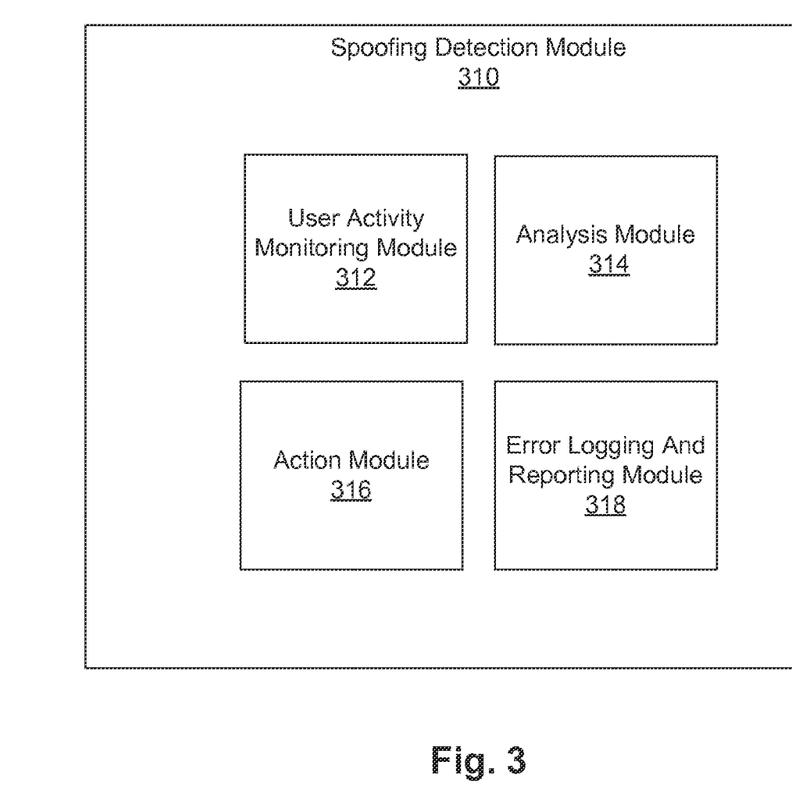
FIG. 3 shows a module for detecting an intranet spoofing attack in accordance with an embodiment of the present disclosure.

FIG. 3 shows a module 310 for detecting an intranet spoofing attack in accordance with an embodiment of the present disclosure. Referring to FIG. 3, there is shown a spoofing detection module 310 in accordance with an embodiment of the present disclosure. As illustrated, the spoofing detection module 310 may contain one or more components including user activity monitoring module 312, analysis module 314, action module 316, and error logging and reporting module 318.

The description below describes network elements, computers, and/or components of a system and method for providing role-based access control using dynamic shared accounts that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

User activity monitoring module 312 may monitor user activity at a user device. For example, user activity monitoring module 312 may identify an attempt to access an intranet website at a user device. In some embodiments, the attempt to access an intranet website by the user may be achieved by using a browser agent that monitors user web activity. In some embodiments, the user device may be an enterprise computing device, such as a laptop computer, a tablet computer, a smart phone, or other web-enabled mobile device.

Analysis module 314 may determine whether the intranet website attempted to be accessed by the user device is a spoofed intranet website. For example, analysis module 314 may receive user activity information from user activity monitoring module 312 and determine that the intranet website attempted to be accessed by the user device is a spoofed intranet website hosted by a malicious party to target unsuspecting users to provide proprietary information. For example, the proprietary information may include personal information, corporate information, confidential communications, financial data, or security information, such as usernames, passwords, personal identification number (PIN), or other compromising information.

Analysis module 314 may determining that the intranet website is a spoofed intranet website by determining that the user device is operating outside of a known secure network. This may be achieved by a variety of techniques. In some embodiments, analysis module 314 may determine a status of hard-wired connection to the known secure network. If it is determined that the user device is connected to the network via wireless rather than hard-wire connection, which is more secure, the connection may be with an non-secure network and the intranet website may be a spoofed intranet website. Analysis module 314 may also determine a status of a secure connection via hypertext transfer protocol secure (HTTPS). If it is determined that the user device is connected to the network via a non-HTTPS connection, the intranet website may also be deemed a spoofed intranet website. Analysis module 314 may also determining a status of a virtual private network (VPN) connection. If there is no established VPN connection, the network connection may be outside of the known network and the intranet website may therefore be a spoofed intranet website. Analysis module 314 may also perform a secure public key handshake with a known intranet website to determine whether a connection is secure and within a known network.

Analysis module 314 may also compare a uniform resource locator (URL) of the intranet website against a list of known uniform resource locator (URL) intranet websites. If the URL of intranet website does not match or correspond to any of the known URLs, then the intranet website may be spoofed as well. Analysis module 314 may also coordinate with a location-based service associated with the user device to determine connection to a known network. For example, a user device may be GPS-enabled or have some other location-based service. Analysis module 314 may coordinate with the GPS-enabled device or location-based service to determine a distance of the user device from the known network. If the distance surpasses a predetermined threshold value, it may be determined that the user device is not within range of the known network and is therefore operating at an external (unknown) network. Thus, the intranet website attempted to be accessed by the user device in this scenario may be a spoofed intranet website hosted by the external network. Analysis module 314 may also use a sniffer to determine that network activity at the user device is external to the known secure network. This may be achieved in conjunction with or independent of user activity monitoring module 312.

If it is determined that the intranet website is likely to be a spoofed intranet website, action module 316 may perform one or more actions. For example, action module 316 may perform block access to the intranet website, notifying a user or an administrator associated with the user device that the intranet website is a spoofed intranet website, or redirect access to another website.

Error logging and reporting module 318 may produce logs, reports, or other information associated with detecting an intranet website spoofing attack. For example, in some embodiments, error logging and reporting module 318 may coordinate with action module 316 to log or report attempted access to the intranet website. This way, a user or administrator may monitor frequency of such attacks and take further remedial action.

One benefit with using these techniques to detect potential intranet website spoofing attacks may be to increase network security and to minimize dissemination of proprietary information to malicious parties, which may be harmful to users, corporations, and financial institutions alike.

Figure 4:
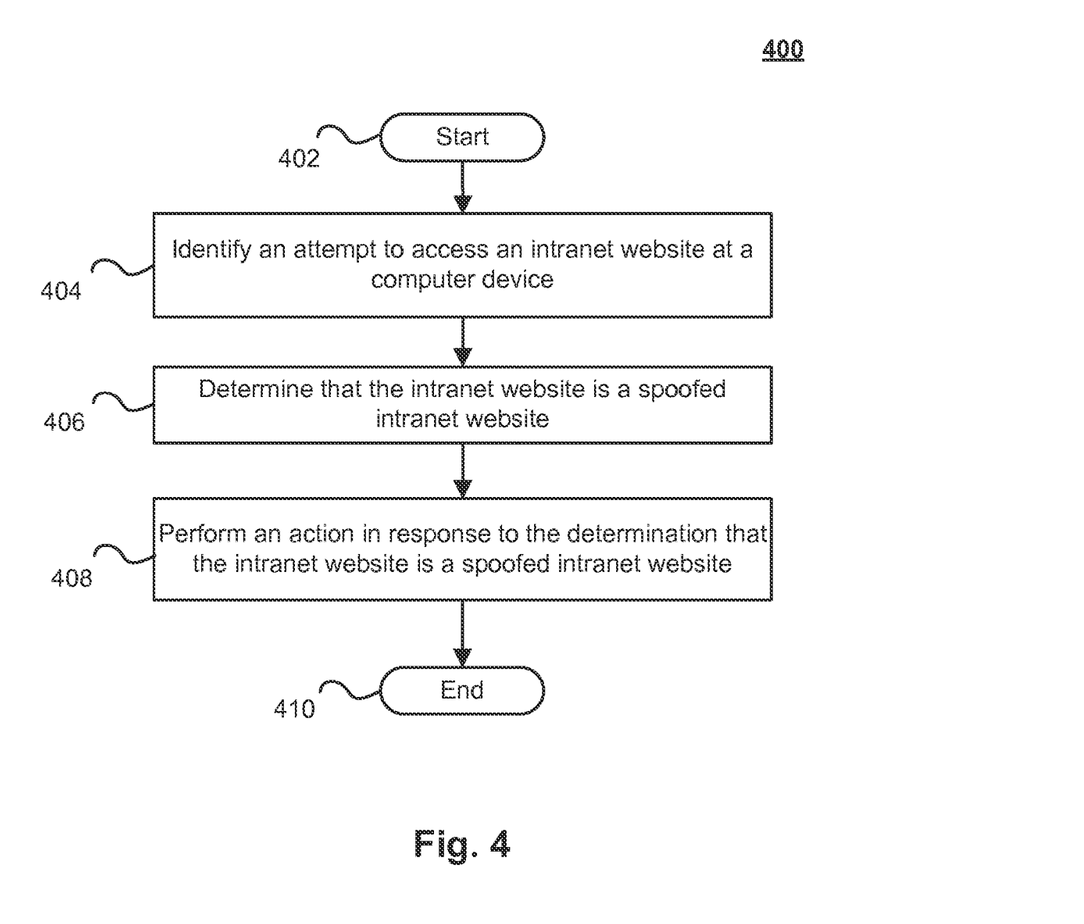
FIG. 4 depicts a flowchart of a method for detecting an intranet spoofing attack in accordance with an embodiment of the present disclosure.

FIG. 4 depicts a flowchart of a method for detecting an intranet spoofing attach in accordance with an embodiment of the present disclosure. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least system 100 in FIG. 1, architecture 200 in FIG. 2, and module 310 in FIG. 3, by way of example, and various elements of system 100 are referenced in explaining the exemplary method of FIG. 4. Each block shown in FIG. 4 represents one or more processes, methods, or subroutines carried in the exemplary method 400. A non-transitory computer-readable medium comprising code or instructions, which when performed by a computer, may perform the acts of the method 400 may also be provided.

Referring to FIG. 4, the exemplary method 400 may begin at block 402.

At block 404, an attempt to access an intranet website at a user device may be identified. In some embodiments, as discussed above, the user device may comprise an enterprise computing device. In other embodiments, the user device may comprise a desktop computer, a laptop computer, a tablet computer, a smart phone, a web-enabled mobile device, or a combination thereof. In some embodiments, the attempt to access an intranet website by the user may be achieved using a browser agent or other monitor to monitor user web activity.

At block 406, the intranet website may be determined to be a spoofed intranet website. The spoofed intranet website may be hosted by a malicious party to target unsuspecting users to provide proprietary information, including personal information, corporate information, security information, financial data, a username, a password, a personal identification number (PIN), a confidential communication, or other proprietary information.

In some embodiments, the intranet website may be determined to be a spoofed intranet website by determining that the user device is operating outside of a known secure network.

In some embodiments, a user device may be determined to be operating outside of a known secure network by determining a status of hard-wired connection to the known secure network. In some embodiments, a user device may be determined to be operating outside of a known secure network by determining a status of a secure connection via hypertext transfer protocol secure (HTTPS). In some embodiments, a user device may be determined to be operating outside of a known secure network by determining a status of a virtual private network (VPN) connection. In some embodiments, a user device may be determined to be operating outside of a known secure network by comparing a uniform resource locator (URL) of the intranet website against a list of known uniform resource locator (URL) intranet websites. In some embodiments, a user device may be determined to be operating outside of a known secure network by using a location-based service associated with the user device. In some embodiments, a user device may be determined to be operating outside of a known secure network by using a sniffer to determine that network activity at the user device is external to the known secure network. In some embodiments, a user device may be determined to be operating outside of a known secure network by performing a secure public key handshake with a known intranet website.

At block 408, an action may be performed in response to the determination of the spoofed intranet website. In some embodiments, access to the intranet website may be blocked. In some embodiments, attempted access to the intranet website may be logged and reported. In some embodiments, a user or an administrator associated with the user device may be notified of the spoofed intranet website or potential attack. In some embodiments, access may be redirected to another website.

At block 410, the method 400 may end.

At this point it should be noted that detecting an intranet website spoofing attack in accordance with the present disclosure as described above typically involves the processing of input data and the generation of output data to some extent. This input data processing and output data generation may be implemented in hardware or software. For example, specific electronic components may be employed in a spoofing detection module or similar or related circuitry for implementing the functions associated with detecting an intranet website spoofing attack in accordance with the present disclosure as described above. Alternatively, one or more processors operating in accordance with instructions may implement the functions associated with detecting an intranet website spoofing attack in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. For example, although the embodiments described herein are generally directed to detecting an intranet website spoofing attack, the techniques provided herein may be implemented for a variety of other types of spoofing attacks. These may include, but not limited to, TCP/IP spoofing, referrer spoofing, caller ID spoofing, and email address spoofing. Thus, such other embodiments and modifications are intended to fall within the scope of the present disclosure.

Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for detecting an intranet website spoofing attack comprising:
    one or more computer hardware processors communicatively coupled to a network and configured to electronically monitor web activity of a user, wherein the one or more computer hardware processors are further configured to:
        identify an attempt to access an intranet website at a user device while electronically monitoring the web activity of the user;
        electronically determine that the intranet website is a spoofed intranet website, wherein determining that the intranet web site is a spoofed intranet web site comprises determining that the user device is operating outside of a known secure network, wherein determining that the user device is operating outside of a known secure network comprises the user device using a location-based service associated with the user device to determine if the user device has surpassed a predetermined threshold distance from the known secure network; and
        electronically block access to the intranet website in response to the determination that the intranet website is a spoofed intranet website.

2. The system of claim 1, wherein the user device comprises an enterprise computing device.

3. The system of claim 1, wherein the user device comprises at least one of a desktop computer, a laptop computer, a tablet computer, a smart phone, and a web-enabled mobile device.

4. The system of claim 1, wherein identifying the attempt to access an intranet website by the user device comprises using a browser agent that monitors the user web activity.

5. The system of claim 1, wherein the spoofed intranet website is hosted by a malicious party to target unsuspecting users to provide proprietary information.

6. The system of claim 5, wherein the proprietary information comprises at least one of personal information, corporate information, security information, financial data, a username, a password, a personal identification number (PIN), and a confidential communication.

7. The system of claim 1, wherein determining that the user device is operating outside of a known secure network further comprises at least one of: determining a status of hard-wired connection to the known secure network, determining a status of a secure connection via hypertext transfer protocol secure (HTTPS), determining a status of a virtual private network (VPN) connection, comparing a uniform resource locator (URL) of the intranet website against a list of known uniform resource locator (URL) intranet websites, using a sniffer to determine that network activity at the user device is external to the known secure network, and performing a secure public key handshake with a known intranet website.

8. The system of claim 1, further comprising, in response to the determination that the intranet website is a spoofed intranet website, performing at least one of:
    logging access to the intranet website, notifying the user or an administrator associated with the user device that the intranet website is a spoofed intranet website, and redirecting access to another website.

9. The system of claim 1, wherein using a location-based service associated with the user device comprises using a global positioning system service associated with the user device to determine that the user device is not within range of the known secure network and instead is operating within an external network.

10. A method for detecting an intranet website spoofing attack comprising:
identifying, via at least one computer hardware processor configured to electronically monitor web activity of a user, an attempt to access an intranet website at a user device while electronically monitoring the web activity of the user;
electronically determining, via the at least one computer hardware processor, that the intranet web site is a spoofed intranet web site, wherein determining that the intranet web site is a spoofed intranet website comprises determining that the user device is operating outside of a known secure network, wherein determining that the user device is operating outside of a known secure network comprises the user device using a location-based service associated with the user device to determine if the user device has surpassed a predetermined threshold distance from the known secure network; and
electronically block access to the intranet website in response to the determination that the intranet website is a spoofed intranet website.

11. The method of claim 10, wherein the user device comprises an enterprise computing device.

12. The method of claim 10, wherein the user device comprises at least one of a desktop computer, a laptop computer, a tablet computer, a smart phone, and a web-enabled mobile device.

13. The method of claim 10, wherein identifying the attempt to access an intranet website by the user device comprises using a browser agent that monitors the user web activity.

14. The method of claim 10, wherein the spoofed intranet website is hosted by a malicious party to target unsuspecting users to provide proprietary information.

15. The method of claim 14, wherein the proprietary information comprises at least one of personal information, corporate information, security information, financial data, a username, a password, a personal identification number (PIN), and a confidential communication.

16. The method of claim 10, wherein determining that the user device is operating outside of a known secure network further comprises at least one of: determining a status of hard-wired connection to the known secure network, determining a status of a secure connection via hypertext transfer protocol secure (HTTPS), determining a status of a virtual private network (VPN) connection, comparing a uniform resource locator (URL) of the intranet website against a list of known uniform resource locator (URL) intranet websites, using a sniffer to determine that network activity at the user device is external to the known secure network, and performing a secure public key handshake with a known intranet website.

17. The method of claim 10, further comprising, in response to the determination that the intranet website is a spoofed intranet website, performing at least one of: logging access to the intranet website, notifying the user or an administrator associated with the user device that the intranet website is a spoofed intranet website, and redirecting access to another website.

18. The method of claim 10, wherein using a location-based service associated with the user device comprises using a global positioning system service associated with the user device to determine that the user device is not within range of the known secure network and instead is operating within an external network.

19. An article of manufacture for detecting an intranet website spoofing attack, the article of manufacture comprising:
at least one non-transitory processor readable storage medium; and
instructions stored on the at least one non-transitory processor readable storage medium;
wherein the instructions are configured to be readable from the at least one non-transitory processor readable storage medium by at least one computer hardware processor configured to electronically monitor web activity of a user and thereby cause the at least one computer hardware processor to operate so as to:
identify an attempt to access an intranet website at a user device while electronically monitoring the web activity of the user;
electronically determine that the intranet website is a spoofed intranet website, wherein determining that the intranet web site is a spoofed intranet web site comprises determining that the user device is operating outside of a known secure network, wherein determining that the user device is operating outside of a known secure network comprises the user device using a location-based service associated with the user device to determine if the user device has surpassed a predetermined threshold distance from the known secure network; and
electronically block access to the intranet website in response to the determination that the intranet website is a spoofed intranet website.

20. The article of manufacture of claim 19, wherein using a location-based service associated with the user device comprises using a global positioning system service associated with the user device to determine that the user device is not within range of the known secure network and instead is operating within an external network.

* * * * *